United States Patent

Ruben

[15] 3,697,155
[45] Oct. 10, 1972

[54] COMPACT ZOOM LENS
[72] Inventor: Paul L. Ruben, Penfield, N.Y.
[73] Assignee: Eastman Kodak Company, Rochester, N.Y.
[22] Filed: Aug. 2, 1971
[21] Appl. No.: 168,307

[52] U.S. Cl..............................350/184, 350/214
[51] Int. Cl..............................................G02b 15/16
[58] Field of Search..........................350/184, 186

[56] References Cited

UNITED STATES PATENTS 3,000,259  9/1961  Turula et al. ..............350/186
3,044,355  7/1962  Cox et al. ..................350/186
3,059,536  10/1962  Cox et al. ..................350/186

*Primary Examiner*—John K. Corbin
*Attorney*—W. H. J. Kline et al.

[57] ABSTRACT

Particular lens parameters are provided which give good corrections in a high aperture, wide-angle zoom lens which has a positive power zoom portion and a strong fourth surface. The zoom lens has a minimal number of elements and is compact in both length and diameter.

5 Claims, 5 Drawing Figures

PAUL L. RUBEN
INVENTOR.

BY Robert F Brooks
H. H. J. Kline
ATTORNEY & AGENT

COMPACT ZOOM LENS

BACKGROUND OF THE INVENTION

1. Field of the Invention

This invention relates to zoom lenses and in particular to a zoom lens suitable for use as a motion picture camera lens at apertures as wide as $f/1.2$.

2. Description of the Prior Art

Most prior art zoom lenses, particularly wide aperture lenses used in motion picture cameras, are of relatively complex construction and require a large number of lens elements. This is objectionable for two reasons. First, the large number of lens elements makes the zoom lens relatively expensive to produce because of the cost of the glass and manufacturing of each individual element. Second, the large number of elements requires a large amount of space to provide adequate room for relative movement of the lens components.

SUMMARY OF THE INVENTION

It is an object of this invention to provide a zoom lens capable of substantially improved optical performance at apertures as wide as $f/1.2$.

It is another object of this invention to provide such a zoom lens which is composed of relatively few elements and which is compact both in length and diameter.

These and other objects are accomplished according to this invention by zoom lenses designed according to parameters to be set forth more fully in the detailed description of the preferred embodiments presented below.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

Figure 1:
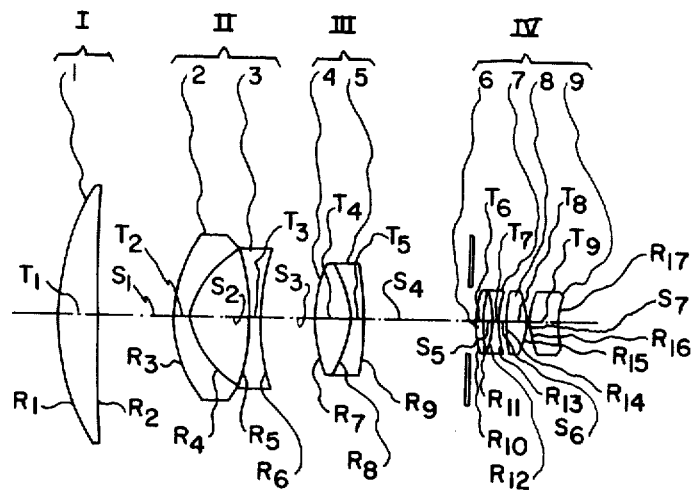
FIGS. 1–5 are diagrammatic axial cross sections of zoom lenses made according to this invention.
Figure 2:
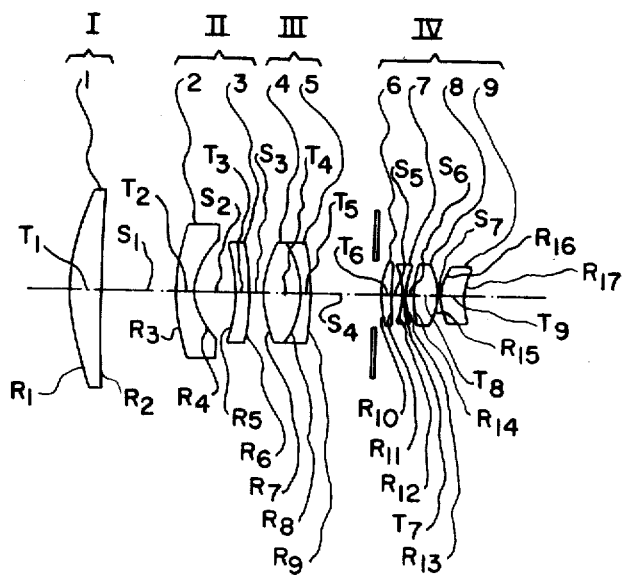
Figure 3:
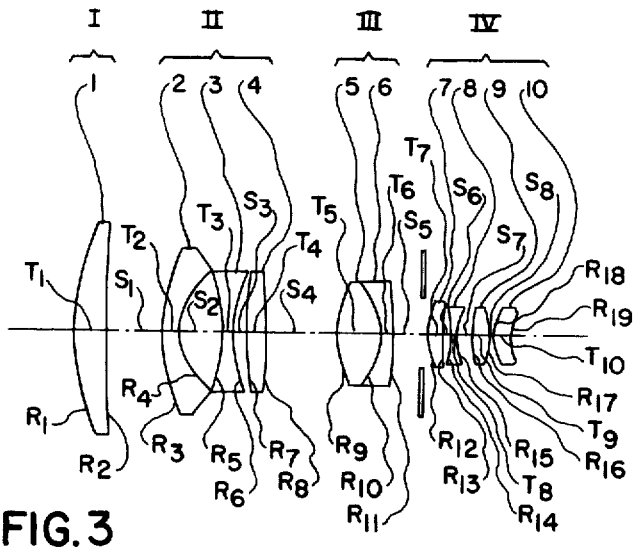
Figure 4:
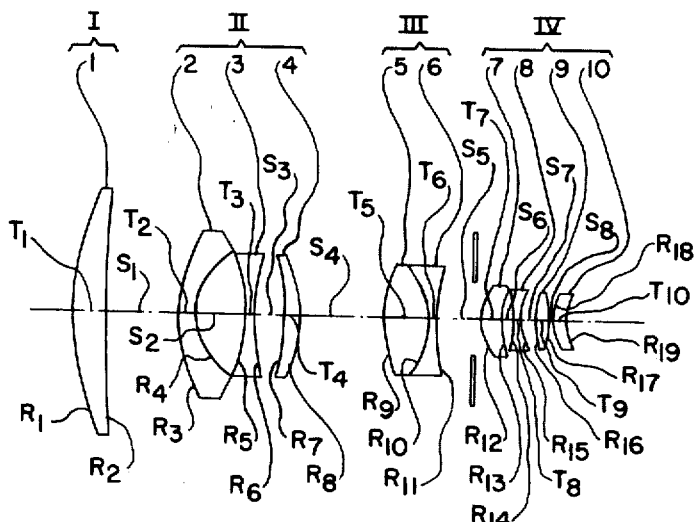
Figure 5:
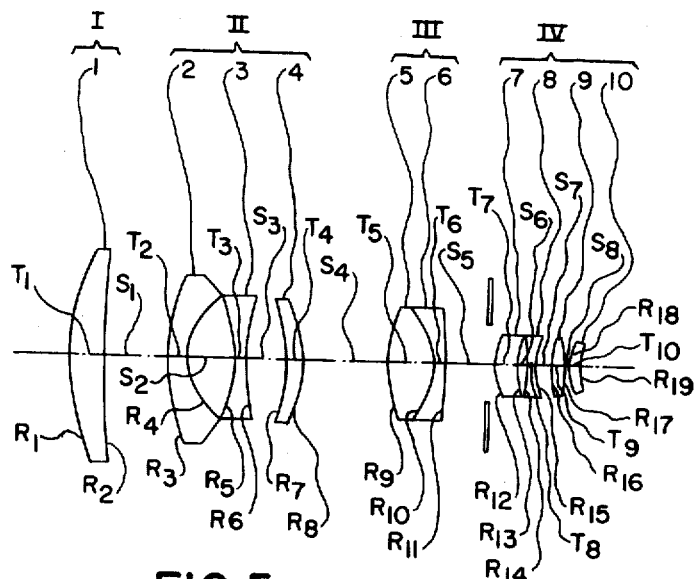

For all purposes of describing or claiming of the invention herein, the term lens shall be used to describe the complete lens and not elements or components thereof. The long conjugate side of the lens is considered the front. The lens components are numbered from front to rear with Roman numerals; the lens elements are numbered from front to rear with Arabic numerals; F is the focal length of the lens; the indexes of refraction N are for the D line of the spectrum; the dispersive indexes V, the radii of curvature R, the thickness T and the separations S are numbered by subscript from front to rear. Radii of curvature having centers of curvature to the rear of the surface are considered positive; those with centers of curvature to the front of the surface are considered negative.

In all figures, component I is positive and is moved, if at all, only for focusing. Components II and III are negative and positive, respectively, and are moved in opposite directions for zooming in a non-linear fashion, except at the extreme long focal length end of the zoom range where they move in the same direction. Component IV is a stationary positive relay.

Well corrected zoom lenses may be made according to this invention by following the specifications in the examples below. In all examples, the geometric mean between the wide angle and telephoto focal lengths is 100 millimeters.

EXAMPLE 1 (FIG. 1)

E.F. from 65.9mm to 151mm     $f/1.2$

| element | $N_1$–$N_9$ | $V_1$–$V_9$ | Radius mm. | Thickness or Separation, mm. |
|---|---|---|---|---|
| 1 | $N_1$=1.61100 | $V_1$=58.8 | $R_1$= 283.03 | $t_1$= 50.95 |
|   |   |   | $R_2$=−3712.8 | $S_1$= 85.928 to 9.944 |
| 2 | $N_2$=1.51700 | $V_2$=64.5 | $R_3$= 157.72 | $t_2$= 19.78 |
|   |   |   | $R_4$= 78.602 | $S_2$= 69.007 |
| 3 | $N_3$=1.51700 | $V_3$=64.5 | $R_5$=−327.81 | $t_3$= 14.51 |
|   |   |   | $R_6$= 298.17 | $S_3$= 62.26 to 207.71 |
| 4 | $N_4$=1.69680 | $V_4$=56.2 | $R_7$= 169.05 | $t_4$= 42.32 |
| 5 | $N_5$=1.689.0 | $V_5$=30.9 | $R_8$=−106.74 | $t_5$= 13.19 |
|   |   |   | $R_9$=−456.15 | $S_4$=126.15 to 56.69 |
| 6 | $N_6$=1.61700 | $V_6$=54.9 | $R_{10}$= 95.529 | $t_6$= 11.72 |
|   |   |   | $R_{11}$=−461.94 | $S_5$= 9.918 |
| 7 | $N_7$=1.61700 | $V_7$=36.6 | $R_{12}$=−79.090 | $t_7$= 7.254 |
|   |   |   | $R_{13}$= 94.203 | $S_6$= 7.122 |
| 8 | $N_8$=1.61100 | $V_8$=58.8 | $R_{14}$=−225.76 | $t_8$= 23.48 |
|   |   |   | $R_{15}$=−69.152 | $S_7$= 0.659 |
| 9 | $N_9$=1.61100 | $V_9$=58.8 | $R_{16}$= 66.290 | $t_9$= 30.96 |
|   |   |   | $R_{17}$=−104.87 |   |

The length of the lens of Example 1 is 625.58mm. The strong fourth surface is an aid in correcting for distortion and in obtaining the wide field coverage available, with a semifield range from 8.9° to 19.7°. The zoom portion, components II and III, has positive power and thus presents a converging beam to the fixed relay component IV. This assists in obtaining the necessary back focus for component IV.

EXAMPLE 2 (FIG. 2)

E.F. from 65.9mm to 151mm     $f/1.2$

| element | $N_1$–$N_9$ | $V_1$–$V_9$ | Radius mm. | Thickness or Separation, mm |
|---|---|---|---|---|
| 1 | $N_1$=1.61100 | $V_1$=58.8 | $R_1$=261.25 | $t_1$=39.03 |
|   |   |   | $R_2$=plano | $S_1$=83.389 to 18.46 |
| 2 | $N_2$=1.51700 | $V_2$=64.5 | $R_3$=237.00 | $t_2$=18.46 |
|   |   |   | $R_4$=71.533 | $S_2$=51.84 |
| 3 | $N_3$=1.51700 | $V_3$=64.5 | $R_5$=−146.33 | $t_3$=13.18 |
|   |   |   | $R_6$=−395.55 | $S_3$=15.70 to 144.00 |
| 4 | $N_4$=1.69680 | $V_4$=56.2 | $R_7$=131.76 | $t_4$=42.96 |
|   |   |   | $R_8$=−99.709 |   |
| 5 | $N_5$=1.68900 | $V_5$=30.9 | $R_9$=−586.31 | $t_5$=11.86 |
|   |   |   | $R_{10}$=−90.425 |   |

| element | $N_1$–$N_{10}$ | $V_1$–$V_{10}$ | Radius | Thickness or separation |
|---|---|---|---|---|
| 6 | $N_6$=1.61700 | $V_6$=54.9 | $R_{11}$=421.57<br>$R_{12}$=−98.628 | $S_6$=80.751 to 17.38<br>$t_7$=12.28 |
| 7 | $N_7$=1.61700 | $V_7$=36.6 | $R_{13}$=81.54<br>$R_{14}$=213.44 | $S_7$=8.895<br>$t_8$=7.254 |
| 8 | $N_8$=larger | $V_8$=58.8 | $R_{15}$=−76.571<br>$R_{16}$=65.220 | $S_8$=6.845<br>$t_9$=27.65 |
| 9 | $N_9$=1.61100 | $V_9$=58.8 | $R_{17}$=101.93 | $S_9$=0.6594<br>$t_{10}$=27.72 |

Example II is essentially the same as Example I. The length of the lens of this example is 448.50mm.

EXAMPLE 3 (FIG. 3)

E.F. 65.4 to 153     f/1.2

| element | $N_1$–$N_{10}$ | $V_1$–$V_{10}$ | Radius mm. | Thickness or separation, mm |
|---|---|---|---|---|
| 1 | $N_1$=1.61100 | $V_1$=58.8 | $R_1$=319.53<br>$R_2$=Plano | $t_1$=43.38<br>$S_1$=93.046 to 11.68 |
| 2 | $N_2$=1.51700 | $V_2$=64.5 | $R_3$=246.02<br>$R_4$=85.393 | $t_2$=20.37<br>$S_2$=55.42 |
| 3 | $N_3$=1.51700 | $V_3$=64.5 | $R_5$=−247.49<br>$R_6$=203.83 | $t_3$=14.55<br>$S_3$=17.09 |
| 4 | $N_4$=1.72000 | $V_4$=29.3 | $R_7$=740.58<br>$R_8$=−740.58 | $t_4$=21.82<br>$S_4$=11.58 to 171.02 |
| 5 | $N_5$=1.69680 | $V_5$=56.2 | $R_9$=154.96<br>$R_{10}$=−91.263 | $t_5$=56.14<br>$t_6$=13.09 |
| 6 | $N_6$=1.68900 | $V_6$=30.9 | $R_{11}$=−741.76 | $S_5$=97.032 to 18.95 |
| 7 | $N_7$=1.61700 | $V_7$=54.9 | $R_{12}$=85.393<br>$R_{13}$=361.23 | $t_7$=17.65<br>$S_6$=8.198 |
| 8 | $N_8$=1.61700 | $V_8$=36.6 | $R_{14}$=−146.61<br>$R_{15}$=72.606 | $t_8$=8.002<br>$S_7$=21.65 |
| 9 | $N_9$=1.61100 | $V_9$=58.8 | $R_{16}$=219.12<br>$R_{17}$=−94.195 | $t_9$=19.60<br>$S_8$=.7274 |
| 10 | $N_{10}$=1.61100 | $V_{10}$=58.8 | $R_{18}$=64.994<br>$R_{19}$=94.195 | $t_{10}$=25.45 |

Example 3 is similar to Example 1 and 2, except for the addition of a third negative element in component II. The length of this lens is 544.80mm while the effective focal length range has been changed to 65.4 to 153mm.

EXAMPLE 4 (FIG. 4)

E. F. 65.4 to 153     f/1.2

| element | $N_1$–$N_{10}$ | $V_1$–$V_{10}$ | Radius mm. | Thickness or separation, mm. |
|---|---|---|---|---|
| 1 | $N_1$=1.61100 | $V_1$=58.8 | $R_1$=381.52<br>$R_2$=Plano | $t_1$=47.28<br>$S_1$=127.23 to 18.78 |
| 2 | $N_2$=1.51700 | $V_2$=64.5 | $R_3$=226.31<br>$R_4$=89.241 | $t_2$=20.37<br>$S_2$=63.37 |
| 3 | $N_3$=1.51700 | $V_3$=64.5 | $R_5$=−207.58<br>$R_6$=314.49 | $t_3$=14.55<br>$S_3$=36.54 |
| 4 | $N_4$=1.7200 | $V_4$=29.3 | $R_7$=−309.62<br>$R_8$=−180.82 | $t_4$=21.82<br>$S_4$=11.73 to 210.29 |
| 5 | $N_5$=1.69680 | $V_5$=56.2 | $R_9$=163.46<br>$R_{10}$=−102.81 | $t_5$=56.93<br>$t_6$=13.09 |
| 6 | $N_6$=1.68900 | $V_6$=30.9 | $R_{11}$=5143.4 | $S_5$=110.02 to 19.91 |
| 7 | $N_7$=1.61700 | $V_7$=54.9 | $R_{12}$=70.743<br>$R_{13}$=195.47 | $t_7$=29.24<br>$S_6$=6.911 |
| 8 | $N_8$=1.61700 | $V_8$=36.6 | $R_{14}$=−408.73<br>$R_{15}$=57.630 | $t_8$=8.002<br>$S_7$=23.55 |
| 9 | $N_9$=1.61100 | $V_9$=58.8 | $R_{16}$=136.23<br>$R_{17}$=−156.47 | $t_9$=17.08<br>$S_8$=.728 |
| 10 | $N_{10}$=1.61100 | $V_{10}$=58.8 | $R_{18}$=55.259<br>$R_{19}$=79.865 | $t_{10}$=17.14 |

Example 4 is similar to Example 3, except for element 4 which has been changed to a meniscus form rather than the positive form of Example 3. The length of this lens is 625.58mm.

EXAMPLE 5 (FIG. 5)

E.F. 65.4 to 153     f/1.2

| element | $N_1$–$N_{10}$ | $V_1$–$V_{10}$ | Radius mm. | Thickness or separation, mm |
|---|---|---|---|---|
| 1 | $N_1$=1.61100 | $V_1$=58.8 | $R_1$=312.88<br>$R_2$=5214.1 | $T_1$=45.83<br>$S_1$=106.56 to 10.53 |
| 2 | $N_2$=1.51700 | $V_2$=64.5 | $R_3$=260.18<br>$R_4$=86.404 | $T_2$=20.37<br>$S_2$=61.30 |
| 3 | $N_3$=1.51700 | $V_3$=64.5 | $R_5$=−209.82<br>$R_6$=326.58 | $T_3$=14.55<br>$S_3$=44.96 |
| 4 | $N_4$=1.72000 | $V_4$=29.3 | $R_7$=−266.71<br>$R_8$=−172.50 | $T_4$=21.82<br>$S_4$=11.33 to 200.84 |
| 5 | $N_5$=1.69680 | $V_5$=56.2 | $R_9$=174.10<br>$R_{10}$=−103.30 | $T_5$=59.82<br>$T_6$=13.09 |
| 6 | $N_6$=1.68900 | $V_6$=30.9 | $R_{11}$=−8705.2 | $S_5$=124.063 to 30.58 |
| 7 | $N_7$=1.61700 | $V_7$=54.9 | $R_{12}$=69.879<br>$R_{13}$=199.61 | $T_7$=32.26<br>$S_6$=6.896 |
| 8 | $N_8$=1.61700 | $V_8$=36.6 | $R_{14}$=−399.40<br>$R_{15}$=56.558 | $T_8$=8.002<br>$S_7$=22.71 |
| 9 | $N_9$=1.61100 | $V_9$=58.8 | $R_{16}$=134.09<br>$R_{17}$=−169.89 | $T_9$=16.62<br>$S_8$=.7274 |
| 10 | $N_{10}$=1.61100 | $V_{10}$=58.8 | $R_{18}$=155.58<br>$R_{19}$=82.301 | $T_{10}$=15.50 |

Example 5 is similar to Example 4, except that the first element has been strengthened and changed to a meniscus form rather than the convex-plano shape of element 1 of Example 4. The length of the lens of this example is 626.41mm.

The invention has been described in detail with particular reference to preferred embodiments thereof, but it will be understood that variations and modifications can be effected within the spirit and scope of the invention.

I claim:

1. A zoom lens having a front zoom portion and a rear relay portion, said zoom portion having a front fixed positive component, a middle movable negative component and a rear movable positive component, said zoom lens being constructed according to the following table wherein, from front to rear, the lens elements are numbered from 1-9, the indexes of refraction for the D line of the spectrum are numbered from $N_1$ to $N_9$, the dispersive indexes are numbered from $V_1$ to $V_9$, the radii are numbered from $R_1$ to $R_{17}$, the thicknesses are numbered from $T_1$ to $T_9$ and the air spaces are numbered from $S_1$ to $S_7$:

E.F. from 65.9mm to 151mm      f/1.2

| element | $N_1$–$N_9$ | $V_1$–$V_9$ | Radius mm. | Thickness or separation, mm. |
|---|---|---|---|---|
| 1 | $N_1$=1.61100 | $V_1$=58.8 | $R_1$=283.03 | $t_1$=50.95 |
|   |   |   | $R_2$=3712.8 | $S_1$=85.928 to 9.944 |
| 2 | $N_2$=1.51700 | $V_2$=64.5 | $R_3$=157.72 | $t_2$=19.78 |
|   |   |   | $R_4$=78.602 | $S_2$=69.007 |
| 3 | $N_3$=1.51700 | $V_3$=64.5 | $R_5$=−327.81 | $t_3$=14.51 |
|   |   |   | $R_6$=298.17 | $S_3$=62.26 to 207.71 |
| 4 | $N_4$=1.69680 | $V_4$=56.2 | $R_7$=169.05 | $t_4$=42.32 |
|   |   |   | $R_8$=−106.74 |   |
| 5 | $N_5$=1.689.0 | $V_5$=30.9 | $R_9$=−456.15 | $t_5$=13.19 |
|   |   |   |   | $S_4$=126.15 to 56.69 |
| 6 | $N_6$=1.61700 | $V_6$=54.9 | $R_{10}$=95.529 | $t_6$=11.72 |
|   |   |   | $R_{11}$=461.94 | $S_5$ 9.918 |
| 7 | $N_7$=1.61700 | $V_7$=36.6 | $R_{12}$=−79.090 | $t_7$=7.254 |
|   |   |   | $R_{13}$=94.203 | $S_6$=7.122 |
| 8 | $N_8$=1.61100 | $V_8$=58.8 | $R_{14}$=225.76 | $t_8$=23.48 |
|   |   |   | $R_{15}$=−69.152 | $S_7$=0.659 |
| 9 | $N_9$=1.61100 | $V_9$=58.8 | $R_{16}$=66.290 | $t_9$=30.96 |
|   |   |   | $R_{17}$=104.87 |   |

2. A zoom lens having a front zoom portion and a rear relay portion said zoom portion having a front fixed positive component, a middle movable negative component and a rear movable positive component, said zoom lens being constructed according to the following table wherein, from front to rear, the lens elements are numbered from 1-9, the indexes of refraction for the D line of the spectrum are numbered from $N_1$ to $N_9$, the dispersive indexes are numbered from $V_1$ to $V_9$, the radii are numbered from $R_1$ to $R_{17}$, the thicknesses are numbered from $T_1$ to $T_9$ and the air spaces are numbered from $S_1$ to $S_7$:

E.F. from 65.9mm to 151mm      f/1.2

| element | $N_1$–$N_9$ | $V_1$–$V_9$ | Radius mm. | Thickness or Separation, mm |
|---|---|---|---|---|
| 1 | $N_1$=1.61100 | $V_1$=58.8 | $R_1$=261.25 | $t_1$=39.03 |
|   |   |   | $R_2$=plano | $S_1$=83.389 to 18.46 |
| 2 | $N_2$=1.51700 | $V_2$=64.5 | $R_3$=237.00 | $t_2$=18.46 |
|   |   |   | $R_4$=71.533 | $S_2$=51.84 |
| 3 | $N_3$=1.51700 | $V_3$=64.5 | $R_5$=−146.33 | $t_3$=13.18 |
|   |   |   | $R_6$=−395.55 | $S_3$=15.70 to 144.00 |
| 4 | $N_4$=1.69680 | $V_4$=56.2 | $R_7$=131.76 | $t_4$=42.96 |
|   |   |   | $R_8$=−99.709 |   |
|   |   |   | $R_9$=−586.31 |   |
| 5 | $N_5$=1.68900 | $V_5$=30.9 | $R_{10}$=90.425 | $t_5$=11.86 |
|   |   |   |   | $S_4$=80.751 to 17.38 |
| 6 | $N_6$=1.61700 | $V_6$=54.9 | $R_{11}$=421.57 | $t_6$=12.28 |
|   |   |   | $R_{12}$=−98.628 | $S_5$=8.895 |
| 7 | $N_7$=1.61700 | $V_7$=36.6 | $R_{13}$=81.54 | $t_7$=7.254 |
|   |   |   | $R_{14}$=213.44 | $S_6$=6.845 |
| 8 | $N_8$=1.61100 | $V_8$=58.8 | $R_{15}$=−76.571 | $t_8$=27.65 |
|   |   |   | $R_{16}$=65.220 | $S_7$=0.6594 |
| 9 | $N_9$=1.61100 | $V_9$=58.8 | $R_{17}$=101.93 | $t_9$=27.72 |

3. A zoom lens having a front zoom portion and a rear relay portion, said zoom portion having a front fixed positive component, a middle movable negative component and a rear movable positive component, said zoom lens being constructed according to the following table wherein, from front to rear, the lens elements are numbered from 1-10, the indexes of refraction for the D line of the spectrum are numbered from $N_1$ to $N_{10}$, the dispersive indexes are numbered from $V_1$ to $V_{10}$, the radii are numbered from $R_1$ to $R_{19}$, the thicknesses are numbered from $T_1$ to $T_{10}$ and the air spaces are numbered from $S_1$ to $S_8$:

E.F. 65.4 to 153      f/1.2

| element | $N_1$–$N_{10}$ | $V_1$–$V_{10}$ | Radius mm. | Thickness or separation, mm |
|---|---|---|---|---|
| 1 | $N_1$=1.61100 | $V_1$=58.8 | $R_1$=319.53 | $t_1$=43.38 |
|   |   |   | $R_2$=Plano | $S_1$=93.046 to 11.68 |
| 2 | $N_2$=1.51700 | $V_2$=64.5 | $R_3$=246.02 | $t_2$=20.37 |
|   |   |   | $R_4$=85.393 | $S_2$=55.42 |
| 3 | $N_3$=1.51700 | $V_3$=64.5 | $R_5$=−247.49 | $t_3$=14.55 |
|   |   |   | $R_6$=203.83 | $S_3$=17.09 |
| 4 | $N_4$=1.72000 | $V_4$=29.3 | $R_7$=740.58 | $t_4$=21.82 |
|   |   |   | $R_8$=−740.58 | $S_4$=11.58 to 171.02 |
| 5 | $N_5$=1.69680 | $V_5$=56.2 | $R_9$=154.96 | $t_5$=56.14 |
|   |   |   | $R_{10}$=−91.263 | $t_6$=13.09 |
| 6 | $N_6$=1.68900 | $V_6$=30.9 | $R_{11}$=−741.76 | $S_5$=97.032 to 18.95 |
|   |   |   | $R_{12}$=85.393 | $t_7$=17.65 |
| 7 | $N_7$=1.61700 | $V_7$=54.9 | $R_{13}$=361.23 | $S_6$=8.198 |
| 8 | $N_8$=1.61700 | $V_8$=36.6 | $R_{14}$=−146.61 | $t_8$=8.002 |
|   |   |   | $R_{15}$=72.606 | $S_7$=21.65 |
| 9 | $N_9$=1.61100 | $V_9$=58.8 | $R_{16}$=−219.12 | $t_9$=19.60 |
|   |   |   | $R_{17}$=−94.195 | $S_8$=.7274 |
| 10 | $N_{10}$=1.61100 | $V_{10}$=58.8 | $R_{18}$=64.994 | $t_{10}$=25.45 |
|   |   |   | $R_{19}$=94.195 |   |

4. A zoom lens having a front zoom portion and a rear relay portion, said zoom portion having a front fixed positive component, a middle movable negative component and a rear movable positive component, said zoom lens being constructed according to the following table wherein, from front to rear, the lens elements are numbered from 1-10, the indexes of refraction for the D line of the spectrum are numbered from $N_1$ to $N_{10}$, the dispersive indexes are numbered from $V_1$ to $V_{10}$, the radii are numbered from $R_1$ to $R_{19}$, the thicknesses are numbered from $T_1$ to $T_{10}$ and the air spaces are numbered from $S_1$ to $S_8$:

E. F. 65.4 to 153      f/1.2

| element | $N_1$–$N_{10}$ | $V_1$–$V_{10}$ | Radius mm. | Thickness or separation, mm. |
|---|---|---|---|---|
| 1 | $N_1$=1.61100 | $V_1$=58.8 | $R_1$=381.52 | $t_1$=47.28 |
|   |   |   | $R_2$=Plano | $S_1$=127.23 to 18.78 |
| 2 | $N_2$=1.51700 | $V_2$=64.5 | $R_3$=226.31 | $t_2$=20.37 |
|   |   |   | $R_4$=89.241 | $S_2$=63.37 |
| 3 | $N_3$=1.51700 | $V_3$=64.5 | $R_5$=−207.58 | $t_3$=14.55 |
|   |   |   | $R_6$=314.49 | $S_3$=36.54 |
| 4 | $N_4$=1.7200 | $V_4$=29.3 | $R_7$=−309.62 | $t_4$=21.82 |
|   |   |   | $R_8$=−180.82 | $S_4$=11.73 to 210.29 |
| 5 | $N_5$=1.69680 | $V_5$=56.2 | $R_9$=163.46 | $t_5$=56.93 |
|   |   |   | $R_{10}$=−102.81 |   |
| 6 | $N_6$=1.68900 | $V_6$=30.9 | $R_{11}$=5143.4 | $t_6$=13.09 |
|   |   |   |   | $S_5$=110.02 to 19.91 |
| 7 | $N_7$=1.61700 | $V_7$=54.9 | $R_{12}$=70.743 | $t_7$=29.24 |
|   |   |   | $R_{13}$=195.47 | $S_6$=6.911 |
| 8 | $N_8$=1.61700 | $V_8$=36.6 | $R_{14}$=−408.73 | $t_8$=8.002 |
|   |   |   | $R_{15}$=57.630 | $S_7$=23.55 |
| 9 | $N_9$=1.61100 | $V_9$=58.8 | $R_{16}$=136.23 | $t_9$=17.08 |
|   |   |   | $R_{17}$=−156.47 | $S_8$=.728 |
| 10 | $N_{10}$=1.61100 | $V_{10}$=58.8 | $R_{18}$=55.259 | $t_{10}$=17.14 |
|   |   |   | $R_{19}$=79.865 |   |

5. A zoom lens having a front zoom portion and a rear relay portion, said zoom portion having a front fixed positive component, a middle movable negative component and a rear movable positive component, said zoom lens being constructed according to the following table wherein, from front to rear, the lens elements are numbered from 1–10, the indexes of refraction for the D line of the spectrum are numbered from $N_1$ to $N_{10}$, the dispersive indexes are numbered from $V_1$ to $V_{10}$, the radii are numbered from $R_1$ to $R_{19}$, the thicknesses are numbered from $T_1$ to $T_{10}$ and the air spaces are numbered from $S_1$ to $S_8$:

E.F. 65.4 to 153     f/1.2

| element | $N_1$–$N_{10}$ | $V_1$–$V_{10}$ | Radius mm. | Thickness or separation, mm |
|---|---|---|---|---|
| 1 | $N_1$=1.61100 | $V_1$=58.8 | $R_1$=312.88 | $T_1$=45.83 |
|   |   |   | $R_2$=5214.1 | $S_1$=106.56 to 10.53 |
| 2 | $N_2$=1.51700 | $V_2$=64.5 | $R_3$=260.18 | $T_2$=20.37 |
|   |   |   | $R_4$=86.404 | $S_2$=61.30 |
| 3 | $N_3$=1.51700 | $V_3$=64.5 | $R_5$=−209.82 | $T_3$=14.55 |
|   |   |   | $R_6$=326.58 | $S_3$=44.96 |
| 4 | $N_4$=1.72000 | $V_4$=29.3 | $R_7$=−266.71 | $T_4$=21.82 |
|   |   |   | $R_8$=−172.50 | $S_4$=11.33 to 200.84 |
| 5 | $N_5$=1.69680 | $V_5$=56.2 | $R_9$=174.10 | $T_5$=59.82 |
|   |   |   | $R_{10}$=−103.30 |   |
| 6 | $N_6$=1.68900 | $V_6$=30.9 | $R_{11}$=−8705.2 | $T_6$=13.09 |
|   |   |   |   | $S_5$=124.063 to 30.58 |
| 7 | $N_7$=1.61700 | $V_7$=54.9 | $R_{12}$=69.879 | $T_7$=32.26 |
|   |   |   | $R_{13}$=199.61 | $S_6$=6.896 |
| 8 | $N_8$=1.61700 | $V_8$=36.6 | $R_{14}$=−399.40 | $T_8$=8.002 |
|   |   |   | $R_{15}$=56.558 | $S_7$=22.71 |
| 9 | $N_9$=1.61100 | $V_9$=58.8 | $R_{16}$=134.09 | $T_9$=16.62 |
|   |   |   | $R_{17}$=−169.89 | $S_8$=.7274 |
| 10 | $N_{10}$=1.61100 | $V_{10}$=58.8 | $R_{18}$=155.58 | $T_{10}$=15.50 |
|   |   |   | $R_{19}$=82.301 |   |

* * * * *